Patented Feb. 13, 1940

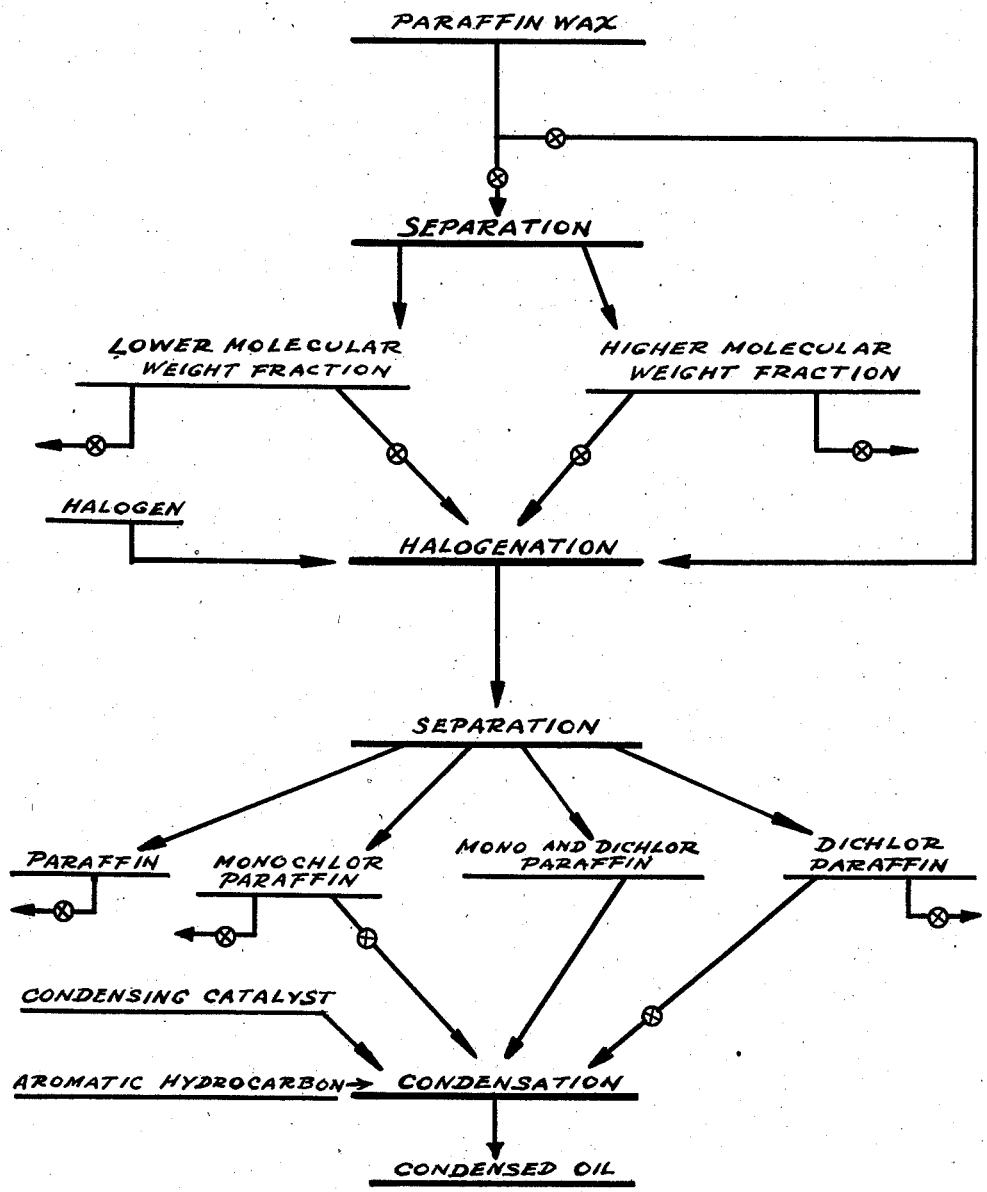

2,189,924

UNITED STATES PATENT OFFICE 2,189,924

PRODUCTS OF HYDROCARBONS

Mathias Pier, Heidelberg, Friedrich Christmann, Ludwigshafen-on-the-Rhine, August Eisenhut, Heidelberg, and Willy Hirschberger, Ludwigshafen-on-the-Rhine, Germany, assignors to I. G. Farbenindustrie Aktiengesellschaft, Frankfort-on-the-Main, Germany Application January 5, 1934, Serial No. 705,376
In Germany January 7, 1933

13 Claims. (Cl. 196—78)

The present invention relates to improvements in the production of condensation products of hydrocarbons, more particularly such condensation products as are themselves lubricating oils or as are valuable addition agents for improving other lubricating oils.

It has already been proposed to halogenate high molecular hydrocarbons rich in hydrogen, especially those consisting wholly or mainly of hard or soft paraffin wax, and to condense the resulting products in the presence of condensing agents, preferably of the Friedel-Crafts type, such as aluminium chloride or zinc chloride, with or without the addition of aromatic hydrocarbons. Depending on the initial materials selected and on the reaction conditions, the resulting products have from lubricating oil to semi-solid nature.

We have now found that in order to obtain separately products having different properties it is very advantageous in many cases to split up the initial materials and/or their halogenation products into two or more fractions having different mean molecular weights before the condensation. Suitable methods for doing this are illustrated in the following description and in the attached drawing, which is a diagrammatic flow plan indicating the order of steps in the alternative processes of this invention.

The said splitting up may be effected for example by fractional distillation. When treating hydrocarbons or derivatives of the said kind which are liquid at ordinary room temperature, but from which solid substances separate on cooling to lower temperatures, the separation may also be effected by fractional deposition, as for example by cooling in stages. Alternatively the said initial materials or halogenated products may be strongly cooled and the separation effected by heating in stages (sweating out).

In this manner fractions having different mean molecular weights are obtained and in the case of the halogenated products, these fractions may also have a different halogen content. The halogenated fractions are then condensed or polymerized as such. If the initial product has already been split up according to this invention, the fractions are halogenated separately and the halogenation products are condensed or polymerized separately, if desired after further splitting up. In this way different kinds of condensation or polymerization products are obtained. The condensation or polymerization may be carried out in the presence of diluents which take practically no part in the reaction, as for example a middle oil saturated with hydrogen, such as hydrogenated middle oil or middle oil obtained from paraffinic crude oil, and/or of products which take part in the reaction, as for example cyclic hydrocarbons, such as naphthalene, or olefines or fractions of petroleums or tars.

As already known, the products obtained from the said initial materials, as for example the products having the nature of lubricating oils, have special properties. For example even when added in small amounts to low grade lubricating oils, they considerably improve the quality of the latter, for example as regards the setting point or the temperature-viscosity curve or both. These advantageous effects are still further enhanced by employing the process according to this invention. For example if a hard or soft paraffin wax treated with chlorine be split up into different fractions by cooling in stages, as for example to 5° C., 2° below zero, 10° below zero, 20° below zero and 40° below zero centigrade, advantageously after previous dilution with acetone, petroleum ether, liquefied hydrocarbons, high molecular alcohols, chlorinated hydrocarbons, cyclic hydrocarbons, ketones or mixtures of these substances, paraffin waxes having different chlorine contents are obtained. These are then condensed or polymerized either alone or with an addition of cyclic hydrocarbons. It has been found for example that the condensation products derived from initial materials of low chlorine content, especially products rich in mono- and dichloro compounds, have the greatest activity in improving the setting point. In carrying out the process, the chlorinated products may first be freed from paraffin wax by filtering or centrifuging at from 15° to 20° C., the chlorinated products then being cooled to about zero centigrade and again filtered or centrifuged. In this way a product greatly enriched in mono- and dichloro compounds is obtained. The condensation or polymerization may also be carried out after previous splitting off of halogen, which may be effected at elevated temperatures, preferably in the presence of bleaching earths, or metal oxides.

The separation may also be effected with the initial material, as for example the paraffin wax. In this way products of different mean molecular weight, as for example 350, 330 and 310, are obtained from an ordinary paraffin wax by cooling in stages, preferably together with a solvent. The fraction of highest molecular weight, after chlorination and subsequent condensation or polymerization, yields the most active product. Its activity may be still further increased by splitting up the chlorination product in the manner described, only the products rich in mono- and dichloro compounds, for example, then being condensed or polymerized, advantageously in the presence of cyclic compounds, such as naphthalene. The highly viscous condensation products prepared from di- and tri-chloro compounds may be employed for improving the viscosity indices of other lubricating oils.

Similar active agents for improving lubricating oils may be obtained from alcohols of high molecular weight, fatty acids and esters, as for example waxes, such as montan wax, or mixtures thereof, by chlorinating the same, splitting up the products formed into several fractions and condensing or polymerizing the single fractions separately, for example the products rich in mono- and dichloro compounds. In this way products having a marked effect in lowering the setting point may be obtained on the one hand, and on the other hand highly viscous cylinder oils which have but slight effect in lowering the setting point but which are very suitable for the preparation of special oils, as for example gear oils, heavy bearing lubricating oils, either alone or together with other cylinder oils.

It is advantageous to carry out the chlorination of the initial materials in such manner that a monochloro product is mainly formed, as for example by atomizing paraffin wax in an atmosphere of chlorine while irradiating with ultra-violet light.

The following examples will further illustrate the nature of this invention but the invention is not restricted to these examples.

Example 1

Chlorine is led at 80° C. into paraffin wax derived from brown coal tar until the resulting chlorination product has a specific gravity of from about 0.870 to 0.875 at 60° C. This product, which contains chlorination products having different chlorine contents as well as from 15 to 20 per cent of unchanged paraffin wax, is freed from the latter by filtration or centrifuging at ordinary temperature (from 15° to 20° C.). The chlorination product is then diluted with twice the amount of acetone and cooled to 5° C., the major portion of the monochloro compounds being thus deposited; these are recovered by filtration or centrifuging. By further cooling to 15° below zero centigrade, a mixture of monochloro and dichloro compounds is deposited. By further cooling to 45° below zero centigrade, almost pure dichloro compounds separate out. Products of higher stages of chlorination, mainly trichlor compounds, remain in solution below 45° below zero centigrade.

If the mixture monochloro and dichloro compounds obtained at 15° below zero C. be condensed after the addition of aluminium chloride and naphthalene, a product is obtained which, when added for example in an amount of 0.1 per cent to a lubricating oil having a setting point of 2° C., lowers the setting point to 23° below zero centigrade.

Example 2

A paraffin wax obtained from mineral oil and having a mean molecular weight of 320 is dissolved in three times the amount of benzine. The mixture is cooled at 7° C., whereby 40 per cent of the paraffin wax is precipitated as a product having a mean molecular weight of 285. The liquid is filtered off and freed from the benzine by distillation, the remaining 60 per cent of the paraffin wax being thus obtained as a product having a mean molecular weight of 343. Both paraffin wax fractions thus obtained are treated with chlorine in the manner described in example 1, mainly dichloro derivatives being formed thereby, each of which is then condensed with naphthalene with the aid in aluminium chloride. In this way the fraction of 285 mean molecular weight furnishes a product which, when added in an amount of 0.1 per cent to a lubricating oil having a pour point of 2° C., reduces the pour point to 19° below zero C., whereas the fraction of 343 mean molecular weight reduces the pour point under the same conditions to 28° below zero centigrade.

What we claim is:

1. The process of producing condensation products of hydrocarbons which comprises halogenating a high molecular hydrocarbon mixture rich in hydrogen whereby a mixture of halogenated hydrocarbons having a different number of halogen atoms per molecule is obtained, separating said mixture into at least two fractions, differing in the proportion of compounds having a given number of halogen atoms per molecule, each of said fractions containing a substantial amount of halogenated hydrocarbons, and separately subjecting at least one of said fractions to the action of a condensing catalyst to produce a condensed hydrocarbon oil of relatively higher molecular weight.

2. Process according to claim 1 in which a fraction containing halogenated hydrocarbons which are substantially only mono-halogenated compounds, is separated from said mixture of halogenated products and is subjected separately to said condensation step.

3. Process according to claim 1 in which a fraction containing halogenated hydrocarbons which are substantially only mono- and di-halogenated compounds is separated from said mixture of halogenated products and is subjected separately to said condensation step.

4. Process according to claim 1 in which a fraction containing halogenated hydrocarbons which are substantially only di- and higher polyhalogenated compounds is separated from said mixture of halogenated products and is subjected separately to said condensation step.

5. Process of producing condensation products of hydrocarbons which comprises separating a high molecular hydrocarbon mixture rich in hydrogen into at least two fractions of different mean molecular weight, separately halogenating at least one of said fractions, whereby a mixture of halogenated hydrocarbons having a different number of halogen atoms per molecule is obtained, separating said mixture into at least two fractions, differing in the proportion of compounds having a given number of halogen atoms per molecule, and separately subjecting at least one of said fractions to the action of a condensing catalyst to produce a condensed hydrocarbon oil of relatively higher molecular weight.

6. Process according to claim 5 in which said high molecular hydrocarbon mixture rich in hydrogen is paraffine wax.

7. The improvement in the preparation of pour point depressors of the condensation type prepared by the chemical condensation of a chlorinated hydrocarbon with an aromatic hydrocarbon in the presence of aluminum chloride, which comprises preparing a mixture of chlorinated hydrocarbons having a different number of halogen atoms per molecule, separating said mixture into at least two fractions, differing in the proportion of compounds having a given number of chlorine atoms per molecule, and separately condensing at least one of said fractions with an aromatic hydrocarbon in the presence of aluminum chloride.

8. The improvement in the preparation of pour point depressors of the condensation type prepared by the chemical condensation of a chlorinated hydrocarbon with an aromatic hydrocarbon in the presence of aluminum chloride, which comprises separating the chlorinated hydrocarbon into a fraction comprising substantially monochloro derivatives of the chlorinated hydrocarbon, and a fraction comprising substantially dichloro derivatives of the chlorinated hydrocarbons and chemically condensing the latter with an aromatic hydrocarbon in the presence of aluminum chloride.

9. The improvement in the preparation of pour point depressors of the condensation type prepared by the chemical condensation of a chlorinated paraffin wax with an aromatic hydrocarbon in the presence of aluminum chloride, which comprises separating the chlorinated paraffin wax into a fraction comprising substantially monochloro derivatives of the chlorinated paraffin wax and a fraction comprising substantially dichloro derivatives of the chlorinated wax and chemically condensing the latter with an aromatic hydrocarbon in the presence of aluminum chloride.

10. The improvement in the preparation of pour point depressors of the condensation type prepared by the chemical condensation of a chlorinated paraffin wax with an aromatic hydrocarbon in the presence of aluminum chloride, which comprises sweating the chlorinated paraffin wax whereby a low melting fraction comprising substantially dichloro derivatives of chlorinated paraffin wax is obtained and chemically condensing the same with naphthalene in the presence of aluminum chloride.

11. The improvement in the preparation of pour point depressors of the condensation type prepared by the chemical condensation of a chlorinated paraffin wax with an aromatic hydrocarbon in the presence of aluminum chloride, which comprises fractionating the chlorinated paraffin wax into fractions comprising substantially monochloro derivatives of chlorinated paraffin wax and a fraction comprising substantially dichloro derivatives of chlorinated paraffin wax by fractional crystallization and chemically condensing the latter with naphthalene in the presence of aluminum chloride.

12. The improvement in the preparation of pour point depressors of the condensation type prepared by the chemical condensation of a chlorinated paraffin wax with an aromatic hydrocarbon in the presence of aluminum chloride, which comprises dissolving the chlorinated paraffin wax in a hydrocarbon solvent, reducing the temperature thereof to about minus 20° C., separating the insoluble fraction at said temperature from the soluble fraction at said temperature, reducing the temperature of the latter to about minus 40° C., separating the insoluble fraction at said last temperature from the soluble fraction at said last temperature, removing the solvent from the latter and chemically condensing the solvent-free filtrate with naphthalene in the presence of aluminum chloride.

13. The improvement in the preparation of pour point depressors of the condensation type prepared by the chemical condensation of a chlorinated paraffin wax with an aromatic hydrocarbon in the presence of aluminum chloride, which comprises dissolving the chlorinated wax in a selective solvent whereby the chlorinated wax is separated into a raffinate comprising substantially monochloro derivatives of the paraffin wax and an extract comprising substantially dichloro derivatives of the chlorinated wax, removing the solvent from the latter and condensing the same with a naphthalene in the presence of aluminum chloride.

MATHIAS PIER.
FRIEDRICH CHRISTMANN.
AUGUST EISENHUT.
WILLY HIRSCHBERGER.